United States Patent
Amemura

(10) Patent No.: US 9,218,298 B2
(45) Date of Patent: Dec. 22, 2015

(54) ELECTRONIC DEVICE SYSTEM AND STORAGE DEVICE

(71) Applicant: Tatsuaki Amemura, Osaka (JP)

(72) Inventor: Tatsuaki Amemura, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 293 days.

(21) Appl. No.: 13/681,659

(22) Filed: Nov. 20, 2012

(65) Prior Publication Data

US 2013/0138906 A1 May 30, 2013

(30) Foreign Application Priority Data

Nov. 29, 2011 (JP) .................. 2011-260619

(51) Int. Cl.
*G06F 12/00* (2006.01)
*G06F 12/14* (2006.01)
*G06F 3/06* (2006.01)
*G06F 13/12* (2006.01)
*G06F 13/00* (2006.01)
*G06F 13/10* (2006.01)
*G06F 13/28* (2006.01)
*G06F 13/16* (2006.01)
*G06F 13/40* (2006.01)

(52) U.S. Cl.
CPC .......... *G06F 12/1416* (2013.01); *G06F 3/0601* (2013.01); *G06F 3/0604* (2013.01); *G06F 3/0605* (2013.01); *G06F 3/0622* (2013.01); *G06F 3/0628* (2013.01); *G06F 3/0634* (2013.01); *G06F 3/0637* (2013.01); *G06F 3/0673* (2013.01); *G06F 3/0683* (2013.01); *G06F 3/0689* (2013.01); *G06F 13/00* (2013.01); *G06F 13/10* (2013.01); *G06F 13/12* (2013.01); *G06F 13/122* (2013.01); *G06F 13/16* (2013.01); *G06F 13/1657* (2013.01); *G06F 13/1668* (2013.01); *G06F 13/1684* (2013.01); *G06F 13/1694* (2013.01); *G06F 13/28* (2013.01); *G06F 13/4022* (2013.01); *G06F 12/00* (2013.01)

(58) Field of Classification Search
None
See application file for complete search history.

(56) References Cited

U.S. PATENT DOCUMENTS

| | | |
|---|---|---|
| 5,526,428 A | 6/1996 | Arnold |
| 2001/0030233 A1 | 10/2001 | Asoh et al. |
| 2007/0088906 A1 | 4/2007 | Mizushima et al. |
| 2010/0250836 A1* | 9/2010 | Sokolov et al. ............... 711/103 |
| 2011/0208913 A1* | 8/2011 | Suzuki et al. ................. 711/115 |
| 2012/0246431 A1* | 9/2012 | Amemura ..................... 711/163 |

FOREIGN PATENT DOCUMENTS

| | | |
|---|---|---|
| CN | 101576857 A | 11/2009 |
| CN | 102055541 A | 5/2011 |
| JP | 63-251879 A | 10/1988 |
| JP | 7-175725 A | 7/1995 |

(Continued)

*Primary Examiner* — Midys Rojas
(74) *Attorney, Agent, or Firm* — Birch, Stewart, Kolasch & Birch, LLP

(57) ABSTRACT

When an SD card is connected to an SD socket of an electronic device, a control unit of the SD card obtains permission/inhibition information (an output signal) outputted from a setting unit of the electronic device. Based on the obtained permission/inhibition information, the control unit starts the operation of a DC-DC converter corresponding to a memory unit from which reading-out of data is permitted. By virtue of this, reading-out of data from the memory unit is achieved in correspondence to the permission/inhibition information.

8 Claims, 7 Drawing Sheets

(56) References Cited

FOREIGN PATENT DOCUMENTS

| | | |
|---|---|---|
| JP | 7-210643 A | 8/1995 |
| JP | 11-175402 A | 7/1999 |
| JP | 11-249966 A | 9/1999 |
| JP | 2007-109036 A | 4/2007 |
| JP | 2007-133770 A | 5/2007 |
| JP | 3133935 U | 7/2007 |
| JP | 2012-203463 A | 10/2012 |
| WO | WO 02/099742 A1 | 12/2002 |

* cited by examiner

F I G. 2
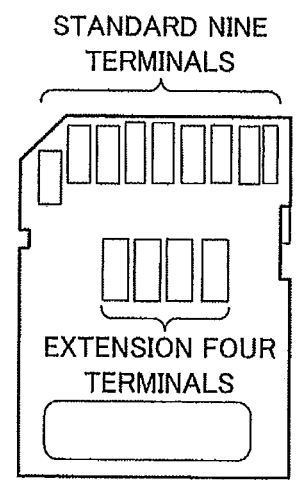

F I G. 4

| OUTPUT SIGNAL | THE CONTENTS OF PERMISSION OR INHIBITION OF DATA READING-OUT |
|---|---|
| (1,1,1,1) | READING-OUT FROM ALL MEMORY UNITS IS PERMITTED |
| (1,1,0,1) | READING-OUT FROM THE FIRST MEMORY UNIT IS PERMITTED |
| (1,0,1,0) | READING-OUT FROM THE SECOND MEMORY UNIT IS PERMITTED |
| OTHER | READING-OUT FROM ALL MEMORY UNITS IS INHIBITED |

F I G. 5
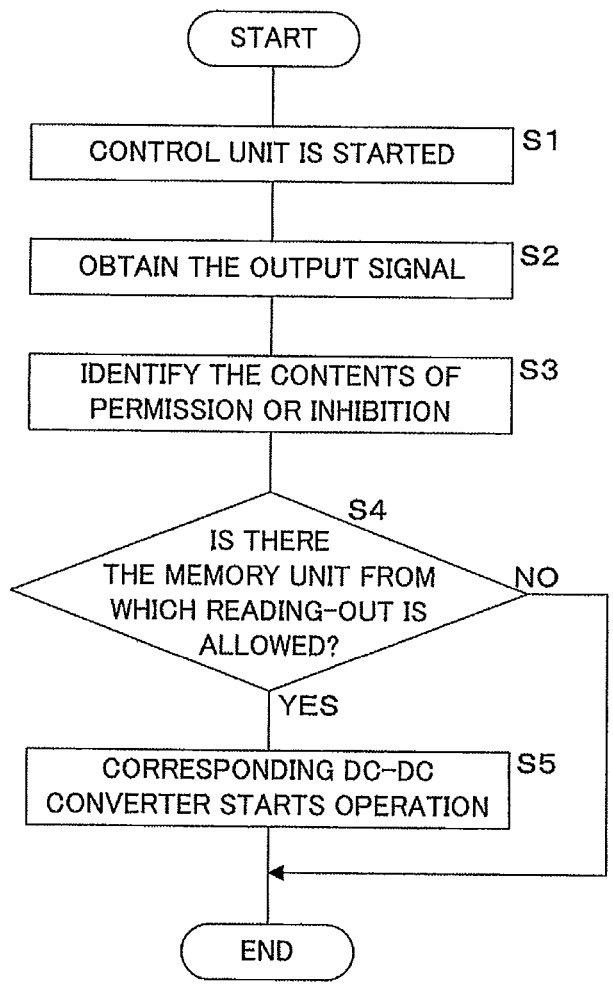

F I G. 6

| MEMORY UNIT INFORMATION | LEVEL |
|---|---|
| FIRST MEMORY UNIT | 8 (1000 IN BINARY) |
| SECOND MEMORY UNIT | 6 (0110 IN BINARY) |

ELECTRONIC DEVICE SYSTEM AND STORAGE DEVICE

CROSS-REFERENCE TO RELATED APPLICATION

This Non-provisional application claims priority under 35 U.S.C. §119(a) on Patent Application No. 2011-260619 filed in Japan on Nov. 29, 2011, the entire contents of which are hereby incorporated by reference.

BACKGROUND

1. Technical Field

The present invention relates to: an electronic device system in which a storage device is connected to an electronic device reading data from the storage device; and the storage device.

2. Description of Related Art

In electronic devices including personal computers and television receivers, many of these are provided with connection interfaces used for connection with external devices. Examples of such connection interfaces are of SD (Secure Digital) standard and of SDIO (Secure Digital Input Output) standard.

Devices compatible with the SDIO standard, in case of power saving ones, do not need own power supply unit and are allowed to operate by electric power supplied from a connected electronic device. Such a device is allowed to be utilized when merely connected to an electronic device, and hence has high universality. Thus, the SDIO standard is adopted in many kinds of devices.

In particular, memories provided with a connection interface of SD standard, that is, so-called SD memory cards, are easy to carry around. Further, cost reduction and capacity enhancement have been achieved. Thus, such memory cards have spread widely. Japanese Patent Application Laid-Open No. 2007-109036 discloses a portable communication terminal to which an SD memory card is allowed to be attached.

SUMMARY

However, such high convenience of the SD memory cards causes a problem that unauthorized leakage of data is easily achieved by using SD memory cards.

Thus, in some cases, a countermeasure is taken that special software is stored in an SD memory card and then, when the SD memory card is attached, the electronic device is forced to execute the software so that unauthorized leakage of data from the SD memory card is suppressed. Nevertheless, such a countermeasure requires complicated setting to the SD memory card and the electronic device. This causes operation burden to unskilled users, and hence often unwanted. Further, even when an authorized user is to read data from the SD memory card in which such a countermeasure is taken, limitations at the time of usage increase like the necessity of inputting a password and like a limitation in the OS (Operating System) type employable in the electronic device to which the SD memory card is applicable.

The present invention has been made with the aim of solving the above problems. It is an object to provide an electronic device system and a storage device in which in a state that universality of the storage device like the SD memory card is maintained, unauthorized leakage of data from the storage device is avoided easily.

An electronic device system according to the present invention is an electronic device system comprising: a storage device storing data; and an electronic device connected to the storage device and reading data from the storage device, wherein the electronic device includes a sending unit for sending, to the storage device, a permission/inhibition information that indicates whether reading-out of data is permitted, and the storage device includes a switching unit for switching, based on the permission/inhibition information sent from the electronic device, whether reading-out of data is permitted.

According to the present invention, in the electronic device system in which an electronic device is connected to a storage device, for example, when the storage device is connected, the electronic device sends permission/inhibition information to the storage device. The permission/inhibition information indicates whether reading-out of data stored in the storage device is permitted, and is registered in advance in the electronic device. When the permission/inhibition information obtained from the electronic device indicates permission of reading-out, the storage device permits reading-out of data stored in itself. When the permission/inhibition information indicates inhibition of reading-out, the storage device inhibits reading-out of data stored in itself. As such, permission or inhibition of reading-out of data from the storage device is allowed to be set for each electronic device. This avoids reading-out of data from the storage device by using unspecified electronic devices, and hence avoids unauthorized leakage of data. Further, since the storage device switches (permits or inhibits) reading-out of data based on the permission/inhibition information obtained from the electronic device, the OS type employable in the electronic device is not limited.

The electronic device system according to the present invention is characterized in that the storage device includes a plurality of storage units, that the permission/inhibition information indicates whether reading-out of data from each storage unit is permitted, and that the switching unit switches, based on the permission/inhibition information, whether reading-out of data from each storage unit is permitted.

According to the present invention, the storage device includes a plurality of storage units, and the permission/inhibition information sent from the electronic device to the storage device indicates whether reading-out of data from each storage unit is permitted. Then, the storage device permits reading-out of data from a storage unit that reading-out of data is permitted in the permission/inhibition information, and inhibits reading-out of data from a storage unit that reading-out of data is inhibited in the permission/inhibition information. As such, permission or inhibition of reading-out is allowed to be set for each storage unit in the storage device, and hence finer usage restriction is achievable.

The electronic device system according to the present invention is characterized in that the electronic device includes a supply unit for supplying electric power to the connected storage device, that the storage device includes a power supply unit for supplying, to each storage unit, electric power supplied from the electronic device, and that the switching unit instructs the power supply unit as to supply electric power to a storage unit from which reading-out of data is permitted in the permission/inhibition information.

According to the present invention, the electronic device supplies electric power to the connected storage device and the storage device supplies the electric power supplied from the electronic device to each storage unit. The storage device supplies electric power to a storage unit from which reading-out of data is permitted in the permission/inhibition information obtained from the electronic device, so as to allow reading-out of data from this storage unit. On the other hand, the storage device does not supply electric power to a storage unit from which reading-out of data is inhibited in the permission/inhibition information, so as to inhibit reading-out of data from this storage unit. As such, in correspondence to whether electric power is supplied or not to each storage unit, reading-out of data from each storage unit is permitted or inhibited. Thus, reading-out of data is allowed to be restricted easily.

The electronic device system according to the present invention is characterized in that the permission/inhibition information indicates a permission/inhibition level expressed by a numerical value, that the storage device includes a determination unit for determining whether the permission/inhibition level indicated by the permission/inhibition information sent from the electronic device is higher than or equal to a given level, and that the switching unit switches, based on the determination result obtained by the determination unit, whether reading-out of data is permitted.

According to the present invention, the permission/inhibition information sent from the electronic device to the storage device indicates a permission/inhibition level expressed by a numerical value. Then, for example, when the permission/inhibition level indicated by the permission/inhibition information obtained from the electronic device is higher than or equal to a given level, the storage device permits reading-out of data stored in itself. When the level is lower than the given level, the storage device inhibits reading-out of data stored in itself. The permission/inhibition information set up in advance in the electronic device is a permission/inhibition level expressed by a numerical value. This permits easy determination of the permission/inhibition information and, hence, further reduces operation burden at the time of registering the permission/inhibition information into the electronic device.

According to the present invention, the storage device includes a plurality of storage units and stores a level having been set up in advance for each storage unit. The storage device compares the permission/inhibition level indicated by the permission/inhibition information obtained from the electronic device with the level of each storage unit. Then, for example, the storage device permits reading-out of data from a storage unit having a level lower than or equal to the permission/inhibition level, and inhibits reading-out of data from a storage unit having a level higher (having a greater number) than the permission/inhibition level. Accordingly, finer usage restriction is achievable for each storage unit in the storage device. Further, based on the permission/inhibition level expressed by a numerical value, permission or inhibition of reading-out is easily allowed to be set up for each storage unit.

According to the present invention, the electronic device and the storage device are connected to each other through connection units provided with SD standard terminals and extension terminals. The electronic device sends permission/inhibition information to the storage device through the extension terminals of the connection unit. Thus, compatibility with the SD standard is maintained.

A storage device according to the present invention is a storage device storing data, comprising: an obtaining unit for obtaining, from the outside, permission/inhibition information that indicates permission or inhibition of reading-out of data; and a switching unit for switching, based on the permission/inhibition information obtained by the obtaining unit, whether reading-out of data is permitted.

According to the present invention, when the permission/inhibition information obtained from the outside indicates permission of reading-out of data, the storage device permits reading-out of data stored in itself. When the permission/inhibition information indicates inhibition of reading-out of data, the storage device inhibits reading-out of data stored in itself. Thus, reading-out of data from the storage device is allowed by using electronic devices having been permitted in advance, and hence unauthorized leakage of data is avoided.

According to the present invention, the storage device includes a plurality of storage units. Then, the storage device permits reading-out of data stored in a storage unit that reading-out of data is permitted in the permission/inhibition information obtained from the outside, and inhibits reading-out of data stored in a storage unit that reading-out of data is inhibited in the permission/inhibition information. Thus, restriction of reading-out is achievable for each storage unit.

In the present invention, a situation is avoided that unspecified electronic devices read data from the storage device. Thus, unauthorized leakage of data is avoided. Further, in comparison with a configuration that the electronic device executes special software, setting and operation to be performed by a user are less complicated. Thus, unauthorized leakage of data is avoided easily. Further, restriction (permission or inhibition) of reading-out is performed on the storage device side. Thus, the OS type employable in the electronic device to which the storage device is applied is not limited, and hence universality is maintained.

The above and further objects and features of the invention will more fully be apparent from the following detailed description with accompanying drawings.

BRIEF DESCRIPTION OF THE SEVERAL VIEWS OF THE DRAWINGS

FIG. 2 is a schematic diagram illustrating an external appearance of an SD card;

FIG. 4 is a schematic diagram illustrating contents stored in a permission/inhibition information table;

FIG. 5 is a flow chart illustrating a procedure of process performed by a control unit of an SD card according to Embodiment 1;

FIG. 6 is a schematic diagram illustrating contents stored in a permission/inhibition information table according to Embodiment 2.

DETAILED DESCRIPTION

The following will describe in detail the present invention with reference to the drawings illustrating embodiments.

Embodiment 1

Figure 1:
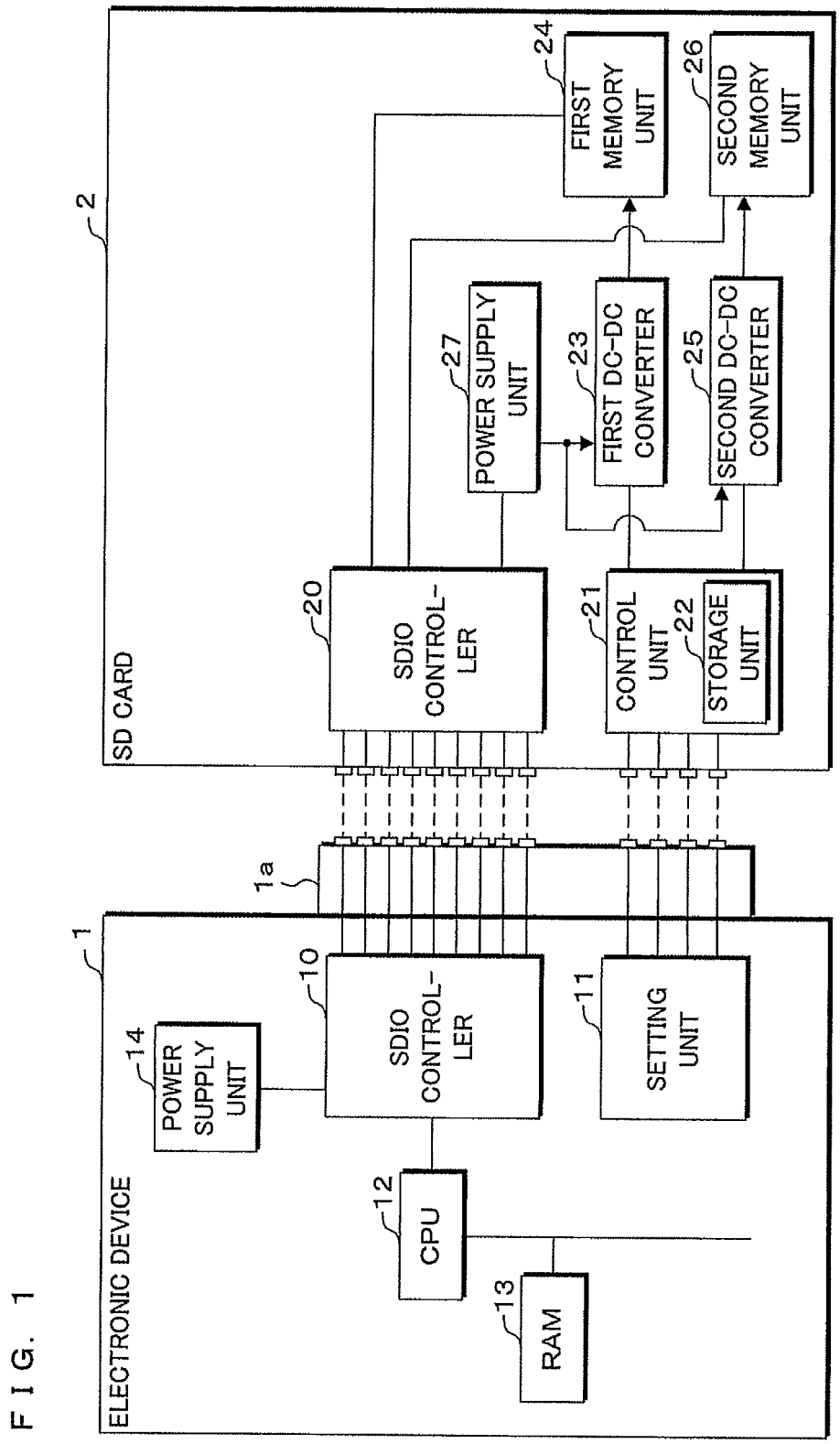
FIG. 1 is a block diagram illustrating a configuration of an electronic device system according to Embodiment 1.

FIG. 1 is a block diagram illustrating a configuration of an electronic device system according to Embodiment 1. In the electronic device system according to the present Embodiment 1, an SD memory card (an SD card, hereinafter) 2 serving as a storage device is connected to an electronic device 1. The electronic device 1 and the SD card 2 are connected to each other through connectors, for example, according to the SD standard.

The electronic device 1 has an SD socket 1*a* to and from which the SD card 2 is attachable and detachable. The SD socket 1*a* is a connector used for connection with the SD card 2 and compatible with an SDIO interface used for input and output of data. The SD socket 1*a* is a connector, for example, according to the UHS-II (Ultra High Speed-II) standard and includes, for example, standard nine terminals compatible with the UHS-I standard and extension four terminals for extending use. Thus, the electronic device 1 and the SD card 2 are connected to each other through 13 signal lines. The UHS-II standard is compatible with the UHS-I standard.

FIG. 2 is a schematic diagram illustrating the external appearance of the SD card 2. FIG. 2 illustrates one face of the SD card 2. The SD card 2 is an SD memory card compatible with the UHS-II standard, and has 13 terminals arranged in the outer peripheral surface and respectively connected to the 13 terminals provided in the SD socket 1*a* of the electronic device 1. The 13 terminals provided in the SD card 2 consist of standard nine terminals for data transmission according to the SD standard and extension four terminals for extending use. As illustrated in FIG. 2, the standard nine terminals are arranged and aligned on an end side of the SD card 2, and the extension four terminals are arranged and aligned in the center part of the SD card 2.

When the SD card 2 is connected to the electronic device 1, the 13 terminals (the connection unit) provided in the SD socket 1*a* are connected directly to the 13 terminals (the connection unit) provided in the surface of the SD card 2.

The SD card 2 is an SD memory card compatible with the UHS-II standard. However, in addition to this, an SD card and an SDIO device compatible with the UHS-I standard are also allowed to be connected to the electronic device 1 through the SD socket 1*a*. Here, when an SD card or an SDIO device compatible with the UHS-I standard is connected to the electronic device 1, the connection is achieved only through the standard nine terminals of the SD socket 1*a*.

The electronic device 1 includes an SDIO controller 10, a setting unit 11, a CPU (Central Processing Unit) 12, a RAM (Random Access Memory) 13, a power supply unit 14, and the like. As described above, the SD socket 1*a* has 13 terminals. Then, among the 13 terminals, the standard nine terminals are connected to the SDIO controller 10, and the extension four terminals are connected to the setting unit 11. Here, FIG. 1 illustrates a state that the standard nine terminals are provided in the upper part of the SD socket 1*a* and that the extension four terminals are provided in the lower part of the SD socket 1*a*.

The setting unit 11 is connected to the extension four terminals of the SD socket 1*a*, and performs data transfer to and from the SD card 2 through the extension four terminals. In the setting unit (sending unit) 11, permission/inhibition information that indicates permission or inhibition of reading-out of the data stored in the SD card 2 is set up (hold) in advance. Then, when the SD card 2 is connected to the SD socket 1*a*, the setting unit 11 sends the permission/inhibition information to the SD card 2 through the extension four terminals.

Figure 3:
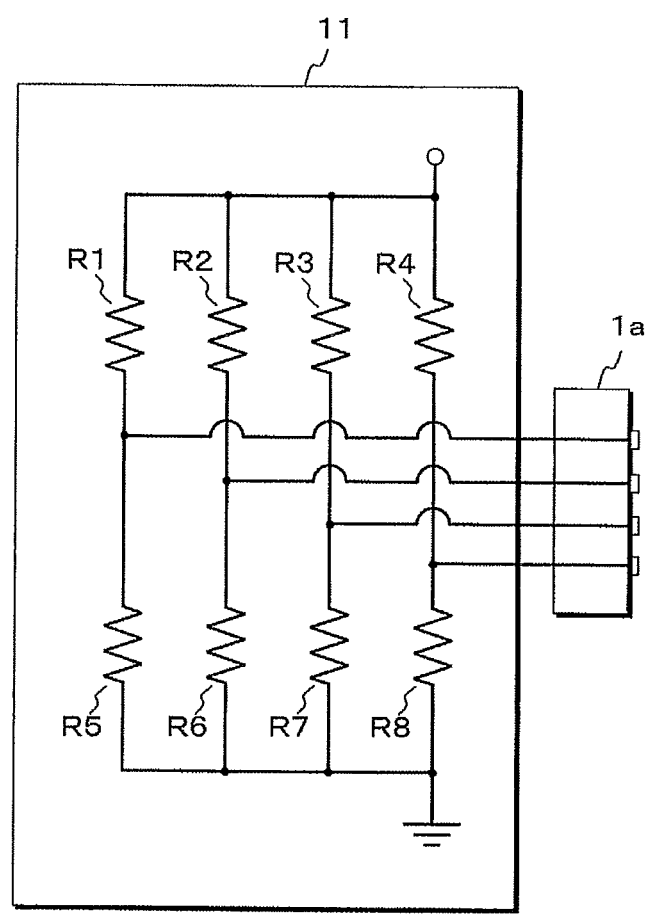
FIG. 3 is a circuit diagram illustrating an exemplary internal configuration of a setting unit.

FIG. 3 is a circuit diagram illustrating an exemplary internal configuration of the setting unit 11. The setting unit 11 is provided with a fixed potential point connected to the power line (not illustrated) to which electric power is supplied from the power supply unit 14. The fixed potential point generates a given fixed potential. The setting unit 11 includes four signal lines connected respectively to each of the extension four terminals of the SD socket 1*a*. Each of the four signal lines is provided with one of pull-up resistors R1 to R4 connected to the fixed potential point or, alternatively, one of pull-down resistors R5 to R8 connected to the ground. When the resistor connected to a signal line is a pull-up resistor, the potential of the signal line becomes high "1". When the resistor connected to a signal line is a pull-down resistor, the potential of the signal line becomes low "0". Since a pull-up resistor or a pull-down resistor is installed in each signal line, the setting unit 11 outputs any one of 16 kinds of signals from (0, 0, 0, 0) to (1, 1, 1, 1) through the four signal lines.

Here, FIG. 3 illustrates a situation that each signal line is connected to one of the pull-up resistors R1 to R4 and one of the pull-down resistors R5 to R8. However, in the actual configuration, each signal line is connected to either a pull-up resistor or a pull-down resistor (e.g., the resistor R1 or R5, the resistor R2 or R6, . . . ).

The signal outputted by the setting unit 11 indicates permission/inhibition information, and the internal circuit of the setting unit 11 is set forth in advance. Thus, the setting unit 11 outputs to the SD card 2 the signal (the permission/inhibition information) set forth in advance. That is, permission or inhibition of reading-out of data stored in the SD card 2 is set up in advance for each electronic device 1.

The SDIO controller 10 serves as an interface for performing process of the host side in data transfer process based on the communication protocols of SDIO standard. When the SD card 2 is connected to the SD socket 1*a*, the SDIO controller 10 performs data transfer to and from the SD card 2 by using the standard nine terminals of the SD socket 1*a*. Further, the power supply unit 14 is connected to the SDIO controller 10. Thus, when the SD card 2 is connected to the SD socket 1*a*, the SDIO controller 10 supplies the electric power supplied from the power supply unit 14, to the SD card 2, by using any one of the standard nine terminals of the SD socket 1*a*.

The SDIO controller 10 is connected to the CPU 12 controlling the operation of each unit provided in the electronic device 1. The CPU 12 is connected to a RAM 13 temporarily storing the data generated at the time that the CPU 12 executes various kinds of process. The CPU 12 loads onto the RAM 13 a control program stored in advance in the storage unit (not illustrated), and then executes the program so as to cause the electronic device 1 to operate as an electronic device of the electronic device system according to the present invention.

In addition, the CPU 12 is connected to various kinds of units (devices) necessary for the electronic device 1, such as a display and an operation unit. As for a configuration implementing the function of the electronic device 1 self, its description is omitted for simplicity.

The power supply unit 14 supplies the electric power supplied from an electric outlet or a battery, to each unit provided in the electronic device 1. Further, the power supply unit 14 supplies the electric power supplied from the electric outlet or the battery, through the SDIO controller 10 to the SD card 2 connected to the SD socket 1*a*.

The SD card 2 includes an SDIO controller 20, a control unit 21, a first DC-DC converter 23, a first memory unit (storage unit) 24, a second DC-DC converter 25, a second memory unit (storage unit) 26, a power supply unit 27, and the like. As described above, the SD card 2 has 13 terminals. Then, among the 13 terminals, the standard nine terminals are connected to the SDIO controller 20, and the extension four terminals are connected to the control unit 21.

The SDIO controller 20 serves as an interface for performing process of the device side in data transfer process based on the communication protocols of SDIO standard. When the SD card 2 is connected to the SD socket 1*a* of the electronic device 1, the SDIO controller 20 performs data transfer to and from the electronic device 1 by using the standard nine terminals. The SDIO controller 20 is connected to the first memory unit 24 and the second memory unit 26. Then, the SDIO controller 20 transfers the data read-out from the first memory unit 24 or the second memory unit 26, to the electronic device 1 through the standard nine terminals.

Further, electric power is supplied from the electronic device 1 to the SD card 2 through any one of the standard nine terminals. Then, the SDIO controller 20 supplies the electric power supplied from the electronic device 1, through the power supply unit 27 to each unit provided in the SD card 2. Here, FIG. 1 illustrates only a situation that the power supply unit 27 supplies electric power to the first DC-DC converter 23 and the second DC-DC converter 25. In addition to the memory units 24 and 26 and the power supply unit 27, the SDIO controller 20 is connected to each unit necessary for the SD card 2. However, their description is omitted for simplicity.

The control unit 21 obtains the output signal (the permission/inhibition information) sent from the setting unit 11 of the electronic device 1 through the extension four terminals. Then, based on the obtained output signal, the control unit 21 controls the operation of the DC-DC converters 23 and 25 and the like. Here, the control unit 21 is connected to the first DC-DC converter 23 and the second DC-DC converter 25, the first DC-DC converter 23 is connected to the first memory unit 24, and the second DC-DC converter 25 is connected to the second memory unit 26.

The first memory unit 24 and the second memory unit 26 are composed of nonvolatile semiconductor memories such as flash memories. Here, the number of the memory units 24 and 26 is not limited to two. That is, three or more memory units may be employed. Further, a single memory unit alone may be employed.

In accordance with the control from the control unit 21, the first DC-DC converter 23 and the second DC-DC converter 25 supply the electric power supplied from the power supply unit 27, to the first memory unit 24 and the second memory unit 26. Further, when the SD card 2 is not connected to the SD socket 1a of the electronic device 1, the first DC-DC converter 23 and the second DC-DC converter 25 are in a stop state. The first DC-DC converter 23 and the second DC-DC converter 25 are converters performing conversion of the DC voltage of the electric power supplied from the power supply unit 27.

When electric power is supplied through the DC-DC converters 23 and 25, the memory units 24 and 26 are brought into a state that access is allowed, that is, reading and writing data by the SDIO controller 20 is allowed. On the other hand, when electric power is not supplied, the memory units 24 and 26 are brought into a state that access is not allowed, that is, reading and writing data by the SDIO controller 20 is not allowed.

The control unit 21 is configured by a microcomputer that includes: an operation unit performing calculation; a storage unit 22 storing in advance a control program necessary for arithmetic operation, and the like; a memory temporarily storing information generated in association with execution of the arithmetic operation; and input terminals and output terminals for the signals. Here, the input terminals of the control unit 21 are connected to four signal lines, and then connected to the extension four terminals through the four signal lines.

The storage unit 22 stores a permission/inhibition information table describing the correspondence between the output signal outputted from the setting unit 11 of the electronic device 1 and the permission/inhibition information (the contents of permission or inhibition of reading-out) indicated by the output signal. FIG. 4 is a schematic diagram illustrating contents stored in the permission/inhibition information table. The permission/inhibition information table illustrated in FIG. 4 stores the correspondence between four patterns of the output signal and the contents of permission or inhibition of reading-out of data from each of the memory units 24 and 26. The contents stored in the permission/inhibition information table are determined in advance by an administrator who administrates the electronic device system. Then, the permission/inhibition information table is stored in advance in the storage unit 22.

When the SD card 2 is connected to the SD socket 1a of the electronic device 1, the control unit (the obtaining unit) 21 obtains the output signal from the setting unit 11 of the electronic device 1, and then reads from the permission/inhibition information table the contents of permission or inhibition (the permission/inhibition information) corresponding to the obtained output signal. In accordance with the contents of permission or inhibition having been read from the permission/inhibition information table, the control unit (the switching unit) 21 instructs the DC-DC converters 23 and 25 to start operation. For example, when the output signal from the setting unit 11 is (1, 1, 1, 1), the contents of permission or inhibition are "reading-out from all memory units is permitted". Thus, the control unit 21 causes the two DC-DC converters 23 and 25 to start operation. Accordingly, the two DC-DC converters 23 and 25 supply respectively to the memory units 24 and 26 the electric power supplied from the power supply unit 27. As a result, reading-out of data from the two memory units 24 and 26 is allowed.

Further, when the output signal from the setting unit 11 is (1, 1, 0, 1), the contents of permission or inhibition are "reading-out from the first memory unit is permitted". Thus, the control unit 21 instructs the first DC-DC converter 23 alone to start operation. Accordingly, the first DC-DC converter 23 supplies to the first memory unit 24 the electric power from the power supply unit 27. As a result, reading-out of data from the first memory unit 24 is allowed. On the other hand, the second DC-DC converter 25 does not supply to the second memory unit 26 the electric power from the power supply unit 27. Thus, reading-out of data from the second memory unit 26 is not allowed.

As such, in correspondence to whether the control unit 21 causes the DC-DC converters 23 and 25 to start operation, reading-out of data from the memory units 24 and 26 is allowed to be controlled (permitted or inhibited).

The control unit 21 may be composed of a PLD (Programmable Logic Device) or a general-purpose logic IC (Integrated Circuit) or, alternatively, may be constructed from a plurality of ICs.

FIG. 5 is a flow chart illustrating a procedure of process performed by the control unit 21 of the SD card 2 according to Embodiment 1. When the SD card 2 is connected to the SD socket 1a of the active electronic device 1 or, alternatively, when the electronic device 1 is started after the SD card 2 is connected to the SD socket 1a, the control unit 21 of the SD card 2 is started (S1).

The control unit 21 detects the potentials on the signal lines connected to the extension four terminals so as to obtain the output signal from the setting unit 11 of the electronic device 1 (S2), and thereby obtains a signal indicating the permission/inhibition information having been set up in advance by the setting unit 11. Based on the contents stored in the permission/inhibition information table stored in the storage unit 22, the control unit 21 identifies the contents of permission or inhibition corresponding to the obtained output signal (S3). Then, based on the identified contents of permission or inhibition, the control unit 21 determines whether there is the memory unit (24 and/or 26) from which reading-out of data is allowed (permitted) (S4).

When there is the memory unit (24 and/or 26) from which reading-out of data is allowed (S4: YES), the control unit 21 causes the corresponding DC-DC converter (23 and/or 25) to start operation (S5). As a result, reading-out of data from the corresponding memory unit (24 and/or 26) is allowed. When there is no memory unit from which reading-out of data is allowed (S4: NO), the control unit 21 skips the process of step S5 and then terminates the process.

In the Embodiment 1, based on the permission/inhibition information (the output signal) set up in advance in the setting unit 11 of the electronic device 1, the control unit 21 of the SD card 2 restricts (permits or inhibits) reading-out of data from the memory units 24 and 26. Thus, permission or inhibition of reading-out of data from the SD card 2 is allowed to be set up for each electronic device 1. This avoids data reading-out by unspecified electronic devices, and hence avoids unauthorized leakage of data. Further, the restriction of data reading-out is performed on the SD card 2 side. Thus, the OS type employable in the electronic device 1 is not limited, and hence universality of the SD card 2 is maintained. Further, in the Embodiment 1, permission or inhibition of reading-out is allowed to be set up for each of the memory units 24 and 26 in the SD card 2. Thus, finer usage restriction is achievable. Further, in the Embodiment 1, the output signal (the permission/inhibition information) outputted from the electronic device 1 to the SD card 2 is transferred through the extension four terminals. Thus, the standard nine terminals are not affected, and hence compatibility with the SD standard is maintained.

In the permission/inhibition information table according to the Embodiment 1, each kind of output signal from the setting unit 11 of the electronic device 1 is in correspondence to the contents of permission or inhibition in which reading-out is permitted from one memory unit, like "reading-out is permitted from the first memory unit" and "reading-out is permitted from the second memory unit". Alternatively, for example, in a case that three or more memory units are provided in the SD card 2, the contents of permission or inhibition in which data reading-out is permitted from a plurality of memory units may be set up, like "reading-out is permitted from the first memory unit and the second memory unit" in response to one output signal.

Embodiment 2

An electronic device system according to Embodiment 2 is described below. The electronic device system according to the present Embodiment 2 has a configuration similar to the electronic device system according to the above-mentioned Embodiment 1. Thus, like configuration components are designated by like numerals, and hence their description is omitted.

In the electronic device system according to the present Embodiment 2, the contents of the permission/inhibition information table stored in the storage unit 22 of the control unit 21 of the SD card 2 are different from those of the above-mentioned Embodiment 1.

FIG. 6 is a schematic diagram illustrating contents stored in the permission/inhibition information table according to Embodiment 2. The permission/inhibition information table illustrated in FIG. 6 stores the correspondence between each of the memory units 24 and 26 and a level having been set up in advance for each of the memory units 24 and 26 in the SD card 2. Also in the Embodiment 2, the contents stored in the permission/inhibition information table are determined in advance by an administrator who administrates the electronic device system. Then, the permission/inhibition information table is stored in advance in the storage unit (the level storage unit) 22.

The setting unit 11 of the electronic device 1 according to the Embodiment 2 has a configuration similar to the setting unit 11 according to Embodiment 1. However, the output signal from the setting unit 11 indicates a permission/inhibition level, where the level of permission or inhibition of reading-out of the data stored in the SD card 2 (the memory units 24 and 26) is expressed by a numerical value. That is, the setting unit 11 according to the Embodiment 2 outputs any one of 16 kinds of signals (permission/inhibition levels) from 0 (0, 0, 0, 0) to 15 (1, 1, 1, 1). Here, correspondence is determined in advance between the individual bit signals outputted through the extension four terminals and the individual bits from the most significant bit to the least significant bit.

When the SD card 2 is connected to the SD socket 1a of the electronic device 1, the control unit 21 obtains the output signal from the setting unit 11 of the electronic device 1. The control unit (determination unit) 21 compares the permission/inhibition level indicated by the obtained output signal with the level of each of the memory units 24 and 26 stored in the permission/inhibition information table. Then, the control unit 21 determines, for example, whether there is a memory unit (24 and/or 26) having a level lower than or equal to the permission/inhibition level indicated by the output signal. Then, the control unit 21 identifies that the memory unit (24 and/or 26) having a level lower than or equal to the permission/inhibition level is a memory unit from which reading-out of data is permitted. Here, an alternative configuration may be employed that the memory unit (24 and/or 26) having a level higher than or equal to the permission/inhibition level indicated by the output signal is identified as a memory unit from which reading-out of data is permitted.

When the memory unit (24 and/or 26) from which reading-out of data is permitted is identified, the control unit 21 instructs the DC-DC converter (23 and/or 25) corresponding to the identified memory unit (24 and/or 26) to start operation. As a result, reading-out of data from the memory unit (24 and/or 26) having a level lower than or equal to the permission/inhibition level is allowed.

For example, when the output signal from the setting unit 11 is 7 (0111 in binary), based on the contents stored in the permission/inhibition information table, the control unit 21 identifies that the second memory unit 26 having a level lower than or equal to the permission/inhibition level of 7 is a memory unit from which reading-out of data is permitted. Then, the control unit 21 instructs the second DC-DC converter 25 corresponding to the second memory unit 26 to start operation. As a result, reading-out of data from the first memory unit 24 having a level higher than the permission/inhibition level of 7 is not allowed, and reading-out of data from the second memory unit 26 having a level lower than or equal to the permission/inhibition level of 7 is allowed.

Figure 7:
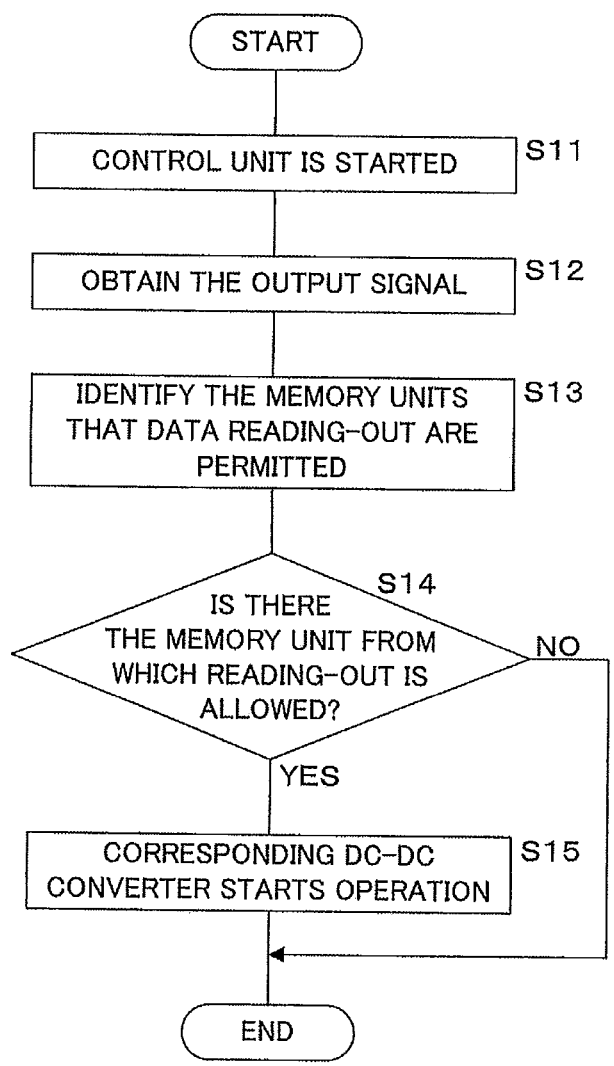
FIG. 7 is a flow chart illustrating a procedure of process performed by a control unit of an SD card according to Embodiment 2.

FIG. 7 is a flow chart illustrating a procedure of process performed by the control unit 21 of the SD card 2 according to Embodiment 2. When the SD card 2 is connected to the SD socket 1a of the active electronic device 1 or, alternatively, when the electronic device 1 is started after the SD card 2 is connected to the SD socket 1a, the control unit 21 of the SD card 2 is started (S11).

The control unit 21 obtains the output signal from the setting unit 11 of the electronic device 1 (S12) so as to obtain a signal indicating the permission/inhibition level having been set up in advance by the setting unit 11. The control unit 21 compares the permission/inhibition level indicated by the obtained output signal with the level of each of the memory units 24 and 26 stored in the permission/inhibition information table. Then, based on the comparison result, the control unit 21 identifies the memory units (24 and/or 26) that reading-out of data are permitted (S13).

From the identification result, the control unit 21 determines whether there is the memory unit (24 and/or 26) from which reading-out of data is allowed (permitted) (S14). When there is the memory unit (24 and/or 26) from which reading-out of data is allowed (S14: YES), the control unit 21 causes the corresponding DC-DC converter (23 and/or 25) to start operation (S15). As a result, reading-out of data from the corresponding memory unit (24 and/or 26) is allowed. When there is no memory unit from which reading-out of data is allowed (S14: NO), the control unit 21 skips the process of step S15 and then terminates the process.

Also in the Embodiment 2, effects similar to those of the above-mentioned Embodiment 1 are obtained. Further, in the Embodiment 2, the permission/inhibition information (an output signal) set up in advance in the setting unit 11 of the electronic device 1 indicates a permission/inhibition level expressed by a numerical value. This permits easy determination of the permission/inhibition information.

The electronic device system according to the above-mentioned Embodiments 1 and 2 has a configuration that reading-out of data is permitted or inhibited for each of the memory units 24 and 26 in the SD card 2. However, an alternative configuration may be employed that reading-out of data from the SD card 2 is simply permitted or inhibited. That is, reading-out of data from the entirety of the memory units 24 and 26 in the SD card 2 may be permitted or inhibited. In this case, the SD card 2 has, in advance, a standard level (a given level) for determining whether reading-out of data from the memory units 24 and 26 is permitted. Then, the control unit 21 of the SD card 2 compares the permission/inhibition level indicated by the permission/inhibition information obtained from the electronic device 1 with the standard level. Then, the control unit 21 switches whether reading-out of data from the memory units 24 and 26 is permitted, based on the comparison result.

Further, a similar configuration may be employed for a case that writing data into the memory units 24 and 26 in the SD card 2 is to be permitted or inhibited.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electronic device system comprising:
    a storage device storing data and including a storage device side connection unit provided with standard terminals and extension terminals; and
    an electronic device connected to the storage device, reading data from the storage device and including an electronic device side connection unit provided with standard terminals and extension terminals, wherein
    the electronic device includes a sending unit that sends a permission/inhibition information indicating whether reading-out of data is permitted to the storage device through the extension terminals of the electronic device side connection unit, when the storage device side connection unit is connected to the electronic device side connection unit, and
    the storage device includes:
    a switching unit that obtains the permission/inhibition information sent from the electronic device through the extension terminals of the storage device side connection unit, and then permits the reading-out of data if the obtained permission/inhibition information indicates that reading-out of data is permitted, and inhibits the reading-out of data if the obtained permission/inhibition information indicates that reading-out of data is not permitted; and
    a sending unit that sends the data to the electronic device through the standard terminals of the storage device side connection unit when the switching unit permits the reading-out of data.

2. The electronic device system according to claim 1, wherein
    the storage device includes a plurality of storage units,
    the permission/inhibition information indicates whether reading-out of data from each storage unit is permitted, and
    the switching unit switches, based on the permission/inhibition information, whether reading-out of data from each storage unit is permitted.

3. The electronic device system according to claim 2, wherein
    the electronic device includes a supply unit that supplies electric power to the connected storage device,
    the storage device includes a power supply unit that supplies, to each storage unit, electric power supplied from the electronic device, and
    the switching unit outputs, to the power supply unit, an instruction to supply electric power to the storage unit from which reading-out of data is permitted in the permission/inhibition information.

4. The electronic device system according to claim 1, wherein
    the permission/inhibition information indicates a permission/inhibition level expressed by a numerical value,
    the storage device includes a determination unit that determines whether the permission/inhibition level indicated by the permission/inhibition information sent from the electronic device is higher than or equal to a given level, and
    the switching unit switches, based on the determination result obtained by the determination unit, whether reading-out of data is permitted.

5. The electronic device system according to claim 4, wherein
    the storage device includes:
    a plurality of storage units; and
    a level storage unit that stores a level having been set up in advance for each storage unit,
    the determination unit compares the permission/inhibition level indicated by the permission/inhibition information sent from the electronic device with the level of each storage unit stored in the level storage unit, and
    the switching unit switches, based on the determination result obtained by the determination unit, whether reading-out of data from each storage unit is permitted.

6. The electronic device system according to claim 1, wherein
    the electronic device and the storage device are connected to each other through connection units provided with SD (Secure Digital) standard terminals and extension terminals.

7. A storage device storing data, comprising:
    a storage device side connection unit provided with standard terminals and extension terminals;
    an obtaining unit that obtains, through the extension terminals of the storage device side connection unit, a permission/inhibition information indicating whether reading-out of data is permitted and sent from the electronic device, when the storage device side connection unit is connected to an electronic device side connection unit of the electronic device including the electronic device side connection unit provided with standard terminals and extension terminals;

a switching unit that permits the reading-out of data if the obtained permission/inhibition information indicates that reading-out of data is permitted, and inhibits the reading-out of data if the obtained permission/inhibition information indicates that reading-out of data is not permitted; and a sending unit that sends the data to the electronic device through the standard terminals of the storage device side connection unit when the switching unit permits the reading-out of data.

8. The storage device according to claim 7, comprising a plurality of storage units, wherein the permission/inhibition information indicates whether reading-out of data from each storage unit is permitted, and the switching unit switches, based on the permission/inhibition information, whether reading-out of data from each storage unit is permitted.

* * * * *